United States Patent Office 2,949,574
Patented Aug. 16, 1960

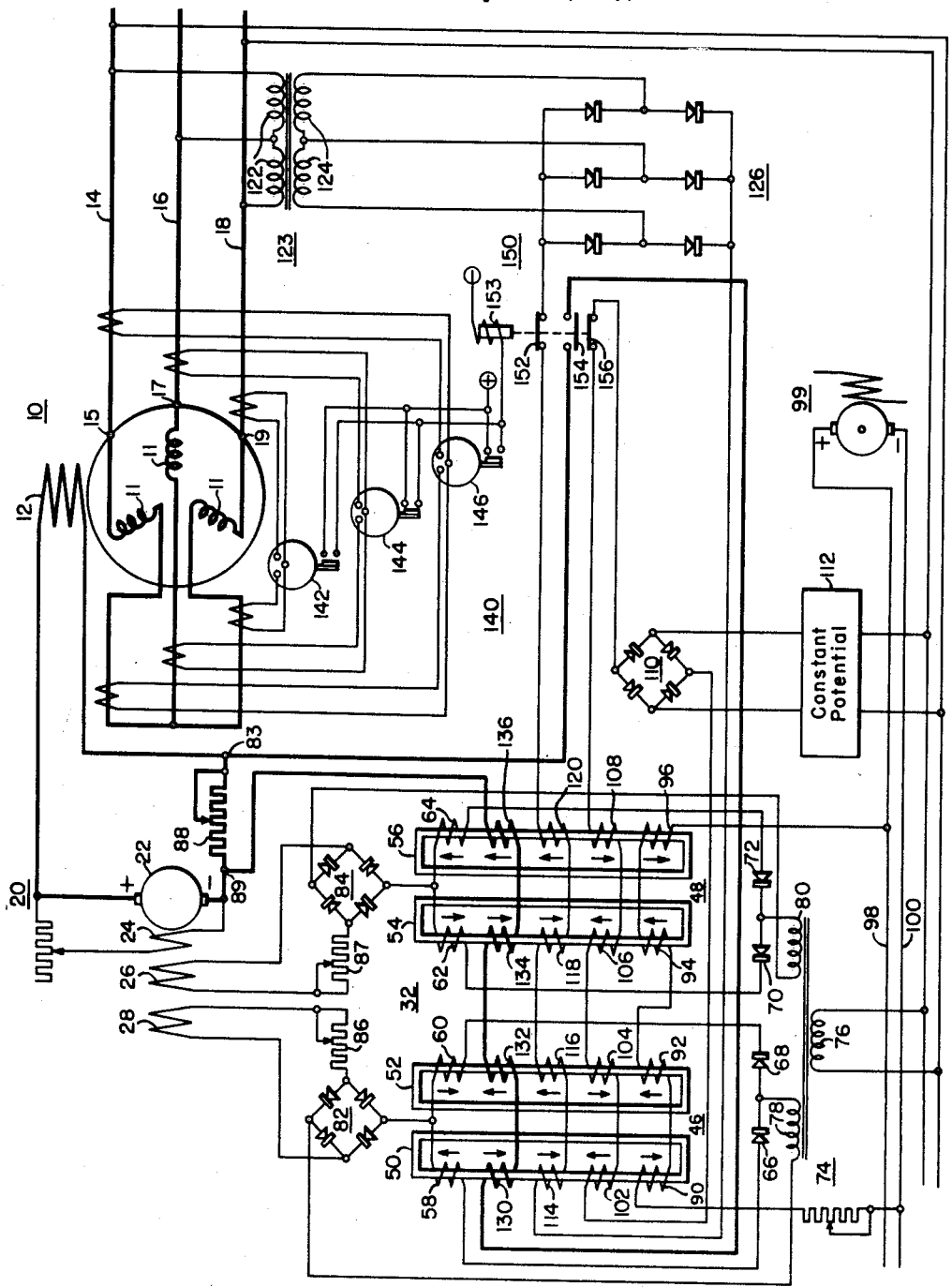

2,949,574

REGULATOR SYSTEM FOR GENERATORS

James T. Carleton, Severna Park, Md., Charles L. Wagner, Franklin Township, Westmoreland County, Pa., and Theodore J. Woth, Atlanta, Ga., assignors to Westinghouse Electric Corporation, East Pittsburgh, Pa., a corporation of Pennsylvania Filed Apr. 12, 1957, Ser. No. 652,586

5 Claims. (Cl. 322—25)

This invention relates to electrical control systems and, more particularly to regulator systems.

Protective relays are often used to provide protection against fault conditions which occur in dynamoelectric machines. These protective relays, having detected fault conditions which would be harmful to a dynamoelectric machine, cause removal of excitation from the dynamoelectric machine. This removal of excitation is frequently accomplished by placing a breaker and discharge resistor in the excitation field of the dynamoelectric machine so that the excitation field current may rapidly be reduced to a negligible value. In larger dynamoelectric machines, the stored energy in the excitation field may be in the order of several million watt seconds and the field breaker may have to interrupt several thousand amperes of direct current. This application requires a sizable and expensive excitation field breaker. Another method to remove excitation from a dynamoelectric machine would be, in the case of direct current exciters, to open a field breaker in the exciter field allowing the exciter output voltage to drop to a negligible value and subsequently the excitation current of the dynamoelectric machine will decrease to a negligible value. The latter method of removing excitation from a dynamoelectric machine has the disadvantage of being a rather slow process and in the event of a fault occurring in the dynamoelectric machine, it is possible that considerable damage would occur to the dynamoelectric machine before its excitation was reduced to a negligible value.

An object of this invention is to provide a new and improved electrical control system.

Another object of this invention is to provide a regulator system for a dynamoelectric machine such that when a fault occurs in the dynamoelectric machine, the regulator system will quickly reduce the excitation current of the dynamoelectric machine to substantially a negligible value.

Another object of this invention is to eliminate the need for an excitation field circuit breaker normally used with larger dynamoelectric machines.

Other objects of the invention will in part be obvious and will in part appear hereinafter.

For a fuller understanding of the nature and objects of the invention, reference should be had to the following detailed description taken in connection with the following drawing, in which the single figure diagrammatically illustrates this invention.

Referring to the drawing, there is illustrated a dynamoelectric machine, specifically a synchronous generator 10 having a field winding 12 and armature windings 11. In this instance, the synchronous generator 10 is disposed to supply power to the line conductors 14, 16 and 18 through the output terminals 15, 17 and 19, respectively, to a three-phase electrical system. In order to obtain an excitation voltage across the field winding 12 of relatively large magnitude, an exciter 20 is provided. In this instance, the exciter 20 comprises an armature 22 which supplies excitation current to the excitation field winding 12 of the synchronous generator 10, a self-exciting winding 24 which is connected in shunt with the armature 22 and the buck and boost field windings 26 and 28, respectively, the purpose of which will be explained hereinafter. In order to maintain the output voltage of the synchronous generator 10 substantially constant, a regulator loop 30, comprising a push-pull magnetic amplifier 32, is interconnected between the output of the synchronous generator 10 and the buck and boost field windings 26 and 28 of the exciter 20.

A differential relay protection system 140 for detecting the presence of a fault condition in the armature windings 11 of the synchronous generator 10 is connected across the armature windings 11 of the synchronous generator 10 and cooperates with the push-pull magnetic amplifier 32, of the regulator loop 30, to change the mode of operation of the regulator loop 30 when a fault condition is detected in the armature windings 11 of the synchronous generator 20. For purposes of clarity, the components and operation of the regulator loop 30 will be described before describing the various components and operation of the differential relay protection system 140.

As illustrated, the push-pull magnetic amplifier 32 is of standard construction and comprises two main sections 46 and 48. The section 46 comprises two magnetic core members 50 and 52, and the section 48 comprises two magnetic core members 54 and 56. In this instance, the load windings 58, 60, 62 and 64 are disposed in inductive relationship with the magnetic core members 50, 52, 54 and 56, respectively. As is customary, self-saturation for the magnetic amplifier 32 is obtained by connecting in series circuit relationship with the load windings 58, 60, 62 and 64, the self-saturating rectifiers 66, 68, 70 and 72 respectively.

In order to form a doubler circuit of the section 46, the series circuit including the load winding 58 and the self-saturating rectifier 66 is connected in parallel circuit relationship with the series circuit including the load winding 60 and the self-saturating rectifier 68. In like manner, in order to form a doubler circuit of the section 48, the series circuit including the load winding 62 and the self-saturating rectifier 70 is connected in parallel circuit relationship with the series circuit including the load winding 64 and the self-saturating rectifier 72.

Energy for the load windings 58, 60, 62 and 64, of the magnetic amplifier 32, is received from a transformer 74 having a primary winding 76, which in this instance is responsive to the output voltage of the synchronous generator 10, and the secondary winding sections 78 and 80. As illustrated, a full-wave dry-type load rectifier 82 is interconnected with the hereinbefore described parallel circuit of the section 46, and with the secondary winding section 78, of the transformer 74, in order to produce a direct-current output for the section 46. In like manner, a full-wave dry-type load rectifier 84 is interconnected with the hereinbefore described parallel circuit of the section 48, and with the secondary winding section 80, of the transformer 74, in order to obtain a direct-current output for the section 48.

The boost field winding 28 of the exciter 20 is responsive to the output of the load rectifier 82 and the buck field winding 26 of the exciter 20 is responsive to the output of the load rectifier 84. In operation, the buck field winding opposes the boost field winding 28. In order to provide means for changing the gain in the regulator loop 30, the variable resistors 86 and 87 are connected in series circuit relationship with the boost field winding 28 and with the buck field winding 26, respectively.

For the purpose of biasing each of the sections 46 and 48 of the magnetic amplifier 32 to approximately half its output, the bias windings 90, 92, 94 and 96 are disposed in inductive relationship with the magnetic core members 50, 52, 54 and 56, respectively. In particular, the bias windings 90, 92, 94 and 96 are connected in series circuit relationship with one another, the series circuit being connected to the conductors 98 and 100 which have applied thereto a substantially constant direct-current voltage from the direct-current voltage source 99. In operation, the current flow through the bias windings 90, 92, 94 and 96 produces a magnetomotive force with respect to their respective magnetic core members that opposes the magnetomotive forces produced by the current flow through the load windings 56, 60, 62 and 64, respectively.

In order to provide a reference point from which to operate in each of the sections 46 and 48 of the magnetic amplifier 32, the reference windings 102, 104, 106 and 108 are disposed in inductive relationship with the magnetic core members 50, 52, 54 and 56, respectively. The reference windings 102, 104, 106 and 108 are so disposed on their respective magnetic core members 50, 52, 54 and 56 that the current flow through the reference windings 102 and 104 produces a magnetomotive force that opposes the magnetomotive force produced by the respective bias windings 90 and 92, and that the current flow through the reference windings 106 and 108 produces a magnetomotive force that is additive with respect to the magnetomotive force produced by the respective bias windings 94 and 96. As illustrated, the reference windings 102, 104, 106 and 108 are connected in series circuit relationship with one another, the series circuit being connected to the output terminals of a full-wave, dry-type rectifier 110 through the normally closed contact 156 of the relay 150. In order that the current flow through the reference windings 102, 104, 106 and 108 remain substantially constant, the input terminals of the rectifier 110 are connected to a constant potential device 112 which produces at its output a substantially constant alternating current irrespective of the magnitude of the output voltage of the synchronous generator 10, to which the constant potential device 112 is responsive.

The control windings 114, 116, 118 and 120 are disposed in inductive relationship with the magnetic core members 50, 52, 54 and 56, respectively. The control windings 114, 116, 118 and 120 are connected in series circuit relationship with one another, the series circuit being connected to the output terminals of a full-wave dry-type rectifier 126 through the normally closed contact 152 of the auxiliary relay 150. The input of the rectifier 126 is rendered responsive to the output terminal voltage of the synchronous generator 10. Specifically, a step-down potential transformer 123 having a primary winding 122 and a secondary winding 124, is provided, the primary winding 122 being connected to the line conductors 14, 16 and 18, and the secondary winding 124 being connected to the input of the rectifier 126.

The control windings 114, 116, 118 and 120 are so disposed on their respective magnetic core members 50, 52, 54 and 56 that when current flows therethrough a magnetomotive force is produced in the respective magnetic core members that opposes the magnetomotive force produced by the current flow through the respective reference windings 102, 104, 106 and 108. The output voltage of the synchronous generator 10 is at its regulated value when the magnetomotive forces produced by the current flow through the control windings 114, 116, 118 and 120 are equal to the respective magnetomotive forces produced by the current flow through the reference windings 102, 104, 106 and 108.

The control windings 130, 132, 134 and 136 are disposed in inductive relationship with the magnetic core members 50, 52, 54 and 56 respectively. The control windings 130, 132, 134 and 136 are connected in series circuit relationship with one another, the series circuit being connected across the adjustable resistor 88 at the terminals 89 and 83 through the normally open contact 154 of the auxiliary relay 150. The adjustable resistor 88 is connected in series circuit relationship with the excitation field winding 12 of the synchronous generator 10 and provides a direct-current voltage which is directly proportional to the excitation field current of the synchronous generator 10.

The control windings 130, 132, 134 and 136 are so disposed on their respective magnetic core members 50, 52, 54 and 56 so that when current flows therethrough a magnetomotive force is produced in the respective magnetic core members that is additive to the magnetomotive force produced by the current flow through the respective control windings 114, 116, 118 and 120. In the absence of a fault condition in the armature windings 11 of the synchronous generator 10, there is no current flow through the control windings 130, 132, 134 and 136 for reasons which will be explained hereinafter.

In operation, when the output voltage of the synchronous generator 10 increases to a voltage above its regulated value, the current flow through the control windings 114, 116, 118 and 120 increases to thereby decrease the output current from the section 46 of the magnetic amplifier 32 and increase the output current from the section 48 of the push-pull magnetic amplifier 32. Such an action increases the current flow through the buck field winding 26 of the exciter 20 and decreases the current flow through the boost field winding 28 to thereby decrease the output voltage of the exciter 20. A decrease in the output voltage of the exciter 20 decreases the magnitude of the voltage across the excitation field winding 12 of the synchronous generator 10 to thereby return the output voltage of the synchronous generator 10 to its regulated value.

On the other hand, a decrease in the output voltage of the synchronous generator 10 to a value below its regulated value decreases the magnitude of the current flow through the control windings 114, 116, 118 and 120. A decrease in the current flow through the control windings 114, 116, 118 and 120 unbalances the push-pull magnetic amplifier 32 in such a direction that the output current from the section 46 of the magnetic amplifier 32 increases and the output current from the section 48 decreases. Such an action increases the magnitude of the current flow through the boost field winding 28 of the exciter 20 and decreases the magnitude of the current flow through the buck field winding 26. This, in turn, increases the magnitude of the output voltage of the exciter 20 as well as the magnitude of the voltage across the excitation field winding 12 of the synchronous generator 10, to thereby return the magnitude of the output voltage of the synchronous generator 10 to its regulated value.

The differential relay protection system 140 will now be described. The differential relay protection system 140 comprises three current-responsive automatic relays 142, 144 and 146 each responsive to the differential of the currents in the circuits on opposite sides of one phase of the armature windings 11 of the synchronous generator 10; an auxiliary relay 150 having an operating coil 153 which may be energized by the contacts of each of the current-responsive automatic relays 142, 144 and 146, and having a normally open contact 154 and two normally closed contacts 152 and 156. Each of the current-responsive automatic relays 142, 144 and 146 is energized by the differential of the electrical output currents of a pair of current transformers respectively energized by the currents on opposite sides of each phase of the armature windings 11 of the synchronous generator 10. The output currents of each pair of current transformers are in opposition in the associated automatic current-responsive relay in the manner well known to the art. The automatic relays are preferably of the type which respond extremely quickly to a current differential which may result when a fault occurs in the armature windings 11. Any one of the current-responsive automatic relays 142, 144 or 146 upon closing its contacts completes an energizing circuit for the operating coil 153 of the auxiliary relay 150. The normally closed contact 152 of the auxiliary relay 150 is connected in series circuit relationship between the output of the full-wave rectifier 126 and the control windings 114, 116, 118 and 120. The normally open contact 154 of the auxiliary relay 150 is connected in series circuit relationship between the terminal 83 at one end of the adjustable resistor 88 and the control windings 130, 132, 134 and 136. The normally closed contact 156 of the auxiliary relay 150 is connected in series circuit relationship between the output of the full-wave rectifier 110 and the reference windings 102, 104, 106 and 108.

The operation of the differential relay protection system 140 will now be described. In the absence of a fault in the armature windings 11, the contacts of the current-responsive automatic relays 142, 144 and 146 will be open and the operating coil 153 of the auxiliary relay 150 will be deenergized. The contacts 152, 154 and 156 of the auxiliary relay 150 will therefore be in their normal positions. With the contact 152 of the auxiliary relay 150 in its normally closed position, the output of the full-wave rectifier 126 will be connected across the control windings 114, 116, 118 and 120. With the contact 154 in its normally open position, there will be no current flow through the control windings 130, 132, 134 and 136 and the voltage across the adjustable resistor 88 which is proportional to the excitation current of the synchronous generator 10 will have no effect on the operation of the regulator loop 30. With the contact 156 in its normally closed position, the output of the full-wave rectifier 110 will be applied across the reference windings 102, 104, 106 and 108 rather than being disconnected as it will be when the contact 156 is open.

The operation of the differential relay protection system 140 when a fault occurs in the armature windings 11 and the effect of such an operation upon the operation of the regulator loop 30 will now be considered. When a fault occurs in the armature windings 11, the contacts on at least one of the current-responsive automatic relays 142, 144 and 146 will close, thus energizing the operating coil 153 of the auxiliary relay 150. The normally closed contact 152 of the auxiliary relay 150 will then open and the output of the full-wave rectifier 126 will be removed from across the control windings 114, 116, 118 and 120. The current flow in the control windings 114, 116, 118 and 120 will then stop and the magnetomotive force in their respective magnetic core members produced by the current flow through the control windings 114, 116, 118 and 120 will be reduced to a negligible value. Also, when the operating coil 153 of the auxiliary relay 150 is energized, the normally closed contact 156 will then open. With the contact 156 in its open position, the output of the full-wave rectifier 110 will be removed from across the reference windings 102, 104, 106 and 108 and the current flow through the reference windings 102, 104, 106 and 108 will be reduced to a negligible value, thus reducing the magnetomotive force in their respective magnetic core members produced by the current flow through the reference windings 102, 104, 106 and 108 to a negligible value. When the operating coil 153 of the auxiliary relay 150 is energized, the normally open contact 154 will close. With the contact 154 of the auxiliary relay 150 in its closed position, the voltage across the adjustable resistor 88 which is proportional to the excitation current of the synchronous generator 10 will be applied across the control windings 130, 132, 134 and 136, thus causing a current to flow in the control windings 130, 132, 134 and 136. Since the magnetomotive forces produced by the current flow in the control windings 114, 116, 118 and 120 and the reference windings 102, 104, 106 and 108 are reduced to negligible values, the current flow through the control windings 130, 132, 134 and 136 produces a magnetomotive force in the respective magnetic core members which controls the output of the magnetic amplifier 32. The magnetomotive forces produced by current flow in the control windings 130, 132, 134 and 136 in their respective magnetic core members are in the same direction as the net magnetomotive forces produced by current flow in the control windings 114, 116, 118 and 120 and the reference windings 102, 104, 106 and 108 when the output voltage of the synchronous generator 10 increases to a value above its regulated value during normal operation of the regulator loop 30. As previously explained for such a condition, the output current from the section 46 of the magnetic amplifier 32 decreases and the output current from the section 48 of the magnetic amplifier increases. This action increases current flow through the buck field winding 26 of the exciter 20 and decreases the current flow through the boost field winding 28 to thereby decrease the output voltage of the exciter 20 and the excitation current of the synchronous generator 10 which flows through the adjustable resistor 88. This action of the regulator loop 30 continues until the excitation current through the adjustable resistor 88 is reduced to a negligible value. The forcing action of the magnetic amplifier 32 in the event of a fault in the armature windings 11 is effective in reducing the exciter output voltage rapidly even to a negative ceiling if necessary to force a rapid reduction of the excitation field current of the synchronous generator 10.

It is to be understood that this invention may be adapted to other types of voltage regulators for dynamoelectric machines. It is also to be understood that this invention is equally adaptable to any of the well-known relaying schemes for the protection of dynamoelectric machines. It is also to be understood that a measure of the excitation field current of the dynamoelectric machine may be obtained from a shunt resistor, a magnetic amplifier or from a current transducer.

The apparatus embodying the teachings of this invention has several advantages. For example, the necessity for an excitation field breaker which is large and expensive for large dynamoelectric machines is eliminated. Another advantage of this invention is that damage to the dynamoelectric machine is kept to a minimum by the rapid action of a regulator system which includes this invention.

Since numerous changes may be made in the above described apparatus and circuit, and different embodiments of the invention may be made without departing from the spirit thereof, it is intended that all the matter contained in the foregoing description or shown in the accompanying drawing shall be interpreted as illustrative and not in a limiting sense.

We claim as our invention:

1. In a control system for a dynamoelectric machine having an excitation field winding and output terminals, the combination comprising means for detecting a fault in the dynamoelectric machine, a magnetic amplifier including magnetic core means and having a first control winding normally responsive to the terminal voltage of the dynamoelectric machine, a second control winding responsive to the excitation field current of the dynamoelectric machine when said fault detecting means detects a fault in the dynamoelectric machine, and a load winding connected to the excitation field winding during normal operation to maintain the terminal voltage of the dynamoelectric machine at substantially a predetermined voltage, said load winding being connected to the excitation field winding to reduce the excitation field current to substantially a negligible value when said fault detecting means detects a fault in the dynamoelectric machine.

2. In a control system for a dynamoelectric machine having an excitation field winding and output terminals, the combination comprising means for obtaining a measure of the terminal voltage of the dynamoelectric machine, means for providing a reference voltage, means for comparing said measure of the terminal voltage with said reference voltage, means for controlling the excitation field winding responsive to the larger of said measure of the terminal voltage or said reference voltage to maintain the terminal voltage of the dynamoelectric machine at substantially a predetermined voltage, a differential relay connected to detect a fault in the dynamoelectric machine, means for obtaining a measure of the excitation field current of the dynamoelectric machine, and means responsive to said relay and said means for obtaining a measure of said field current for changing the operation of said controlling means to regulate the excitation field current to substantially a negligible value when said differential relay detects a fault in the dynamoelectric machine.

3. In a control system for a dynamoelectric machine having an excitation field winding and output terminals, the combination comprising a differential relay connected to detect a fault in the dynamoelectric machine, a magnetic amplifier including magnetic core means and having a first control winding normally responsive to the terminal voltage of the dynamoelectric machine, a second control winding responsive to the excitation field current of the dynamoelectric machine when said differential relay detects a fault in the dynamoelectric machine, and a load winding connected to the excitation field winding during normal operation in the absence of a fault in said machine to maintain the terminal voltage at substantially a predetermined voltage, said load winding being connected to the excitation field winding to reduce the excitation field current substantially to a neglible value when said differential relay detects a fault in the dynamoelectric machine.

4. In a control system for a dynamoelectric machine having an excitation field winding and output terminals, the combination comprising, first means for detecting a fault in said machine; second means for providing a reference voltage; a magnetic amplifier having a first control winding connected to be normally responsive to the output terminal voltage of said machine, a reference winding connected to said second means, a second control winding connected to be responsive to the excitation field current of said machine only when said first means detects a fault and a load winding connected to said field winding to control the excitation current during normal operation in accordance with the net magnetomotive force produced by said first control winding and said reference winding and maintaining the output voltage of said machine at a predetermined value; and third means responsive to said first means for energizing said second control winding when said first means detects a fault and for reducing the magnetomotive forces of said first control winding and said reference windings to negligible values, said load winding being responsive only to said second control winding when said first means detects a fault to thereby reduce said excitation current to a negligible value.

5. In a control system for a dynamoelectric machine having an excitation field winding and output terminals, the combination comprising first means for detecting a fault in said machine, second means for obtaining a measure of the output voltage of said machine, third means for providing a reference potential, fourth means connected to said second and third means for controlling the excitation current applied to said field winding to maintain said measure of the output voltage equal to said reference potential and to maintain said output voltage of said machine at a predetermined value, said fourth means being responsive to the output voltage of said machine during normal operation, and fifth means responsive to said first means for disconnecting said second and third means from said fourth means and for connecting said fourth means to be responsive to said excitation current when said first means detects a fault, said fourth means being connected to reduce said excitation current to a negligible value after said first means detects a fault.

References Cited in the file of this patent

UNITED STATES PATENTS

| 768,868 | Stockmeyer | Aug. 30, 1904 |
| 1,116,430 | Jackson | Nov. 10, 1914 |
| 1,600,348 | Mayer | Sept. 21, 1926 |
| 1,906,817 | Seeley | May 2, 1933 |
| 2,484,247 | Ratz | Oct. 11, 1949 |
| 2,683,857 | Bradley | July 13, 1954 |
| 2,724,797 | Storm | Nov. 22, 1955 |
| 2,757,332 | Carleton et al. | July 31, 1956 |
| 2,806,990 | Evans | Sept. 17, 1957 |

FOREIGN PATENTS

| 345,751 | Great Britain | Apr. 2, 1931 |